OR    3,756,684

United States
Fox

[11] 3,756,684
[45] Sept. 4, 1973

[54] COARSE PINHOLE ARRAY FOR RECORDING IMPROVED REDUNDANT HOLOGRAMS

[75] Inventor: Edward Coley Fox, Cranbury, N.J.
[73] Assignee: RCA Corporation, New York, N.Y.
[22] Filed: Dec. 9, 1971
[21] Appl. No.: 206,389

[52] U.S. Cl. .................................................. 350/3.5
[51] Int. Cl. ............................................ G02b 27/00
[58] Field of Search ...................... 350/3.5, 162 SF; 96/27 H, 36.2

[56]         References Cited
           UNITED STATES PATENTS
3,689,129   9/1972   Lurie ..................... 350/3.5
3,405,614   10/1968  Lin et al. ............... 350/3.5
3,529,887   9/1970   Lu............................ 350/3.5
3,545,854   12/1970  Olsson...................... 350/3.5
3,582,177   6/1971   Kiemle...................... 350/3.5
3,658,403   4/1972   Greenaway et al. .... 350/3.5
3,658,404   4/1972   Greenaway ............. 350/3.5

OTHER PUBLICATIONS
Lu, 56 Proceedings of the IEEE, 116–117 (1/1968)
Sincerbox, 10 IBM Tech. Disc. Bulletin 267, 268 (8/1967)
GCO Holographic Components (2 Sheets) (4/1971)

*Primary Examiner*—David Schonberg
*Assistant Examiner*—Ronald J. Stern
*Attorney*—Edward J. Norton, Glenn H. Bruestle and Irwin M. Krittman

[57]         ABSTRACT

The use of a redundancy means including a pinhole array having a ratio of the distance between adjacent pinholes to the maximum linear dimension of a pinhole of at least 30 not only provides high effective redundancy, but the spatial signal-to-noise ratio in the reconstructed image of a recorded hologram recorded with such a pinhole array and played back with coherent wave energy is significantly higher than heretofore obtainable, particularly when less than ideal optic elements are employed in the recording system.

17 Claims, 3 Drawing Figures

SQUARE PINHOLE ARRAY FRAGMENT

HEXAGONAL PINHOLE ARRAY FRAGMENT

COARSE PINHOLE ARRAY FOR RECORDING IMPROVED REDUNDANT HOLOGRAMS

This invention relates to an improved system for recording redundant holograms of a non-scattering object.

As is known, a redundant hologram can be severely scratched, spotted with dirt, and even broken into pieces without causing more than a slight loss in overall resolution and contrast in the reconstructed image thereof. Holograms of three-dimensional objects and other scattering objects are inherently redundant. However, if the object is a transparency, such as a photographic slide or a frame of a motion picture, or is another type of non-scattering object, such as a specularly reflecting object, special redundancy means must be provided in the recording of the hologram in order that it be redundant.

Conventionally, the desired redundancy is achieved by utilizing an information beam composed of diffused light in recording the hologram. More specifically, it is the practice to pass a beam of spatially coherent light through a plate of diffusing glass, such as opal glass, prior to shining it through a transparency having thereon information to be recorded. When such a diffused redundant hologram is played back with coherent wave energy, background noise, including "speckle," results unless the hologram is very large, due to the completely random characteristics of the diffused reflecting surface employed in recording the hologram. The speckle noise in the reproduced image is similar to that of grain noise found in a photographic image print.

The signal-to-speckle noise power ratio of a diffused redundant hologram is approximately given by the ratio of the area of the smallest spot diameter that can be reproduced from a hologram considering the entire recording and reproducing system and the smallest spot diameter that can be reproduced from that hologram taking into consideration only the diffraction limit. Since large holograms have a very small diffraction limit, while small holograms have a relatively large diffraction limit, speckle noise is much more apparent in small holograms than it is in large holograms. However, to obtain high information packing density in the recording of holograms, just as in the case of recording conventional microfilms, it is most desirable to make the area of a hologram recording quite small (having dimensions in the order of one-fourth inch or less, by way of example), where the speckle noise problem is the worst.

In accordance with the teaching of the copending U.S. Pat. application Ser. No. 133,807, filed Apr. 14, 1971 by Lurie, now U.S. Pat. No. 3,689,129 and assigned to the same assignee as the present application, a redundant, speckle-free hologram recording may be achieved by substituting a pinhole array having given characteristics for the conventional diffuser. In particular, the pinhole array is relatively coarse, having a ratio of the distance between adjacent pinholes to the size of an individual pinhole of at least five and, preferably, in the order of 10. Such a pinhole array in itself is capable of providing relatively high redundancy only with relatively low resolution due to the relatively large distance between adjacent pinholes of the relatively coarse array. However, as taught in Lurie, by properly selecting the distance between the pinhole array and the transparency being recorded, both relatively high redundancy and relatively high resolution in the recording of the hologram may be achieved.

The present invention is also directed to a redundancy means for recording a hologram which includes a pinhole array. However, the pinhole array employed in the present invention is many times coarser than even the relatively coarse pinhole array diclosed in the aforesaid U.S. Pat. application Ser. No. 133,807. In particular, the pinhole array employed in the present invention is at least three times and may be as much as one hundred times as coarse as the most coarse array taught in the aforesaid U.S. Pat. application Ser. No. 133,807. The present array is capable of providing significantly higher effective redundancy than the array disclosed in the aforesaid U.S. Pat. application Ser. No. 133,807. However, much more important, is the fact that in accordance with the teachings of the present invention, the spatial signal-to-noise ratio in the reconstructed image of a recorded hologram recorded with the improved recording system of the present invention and played back with coherent wave energy is significantly higher than that obtainable with prior art redundant hologram recording systems, including the one disclosed in the aforesaid copending Lurie U.S. Pat. application Ser. No. 133,807. This is particularly true in a practical redundant hologram recording system, where conditions are not ideal. a certain amount of optical defects always exist in actual redundant hologram recording systems. These optical defects tend to produce spurious fringe patterns as noise in a reconstructed redundant hologram played back with coherent wave energy.

These and other features and advantages of the present invention will become more apparent from the following detailed discussion taken together with the accompanying drawing in which.

Figure 1:
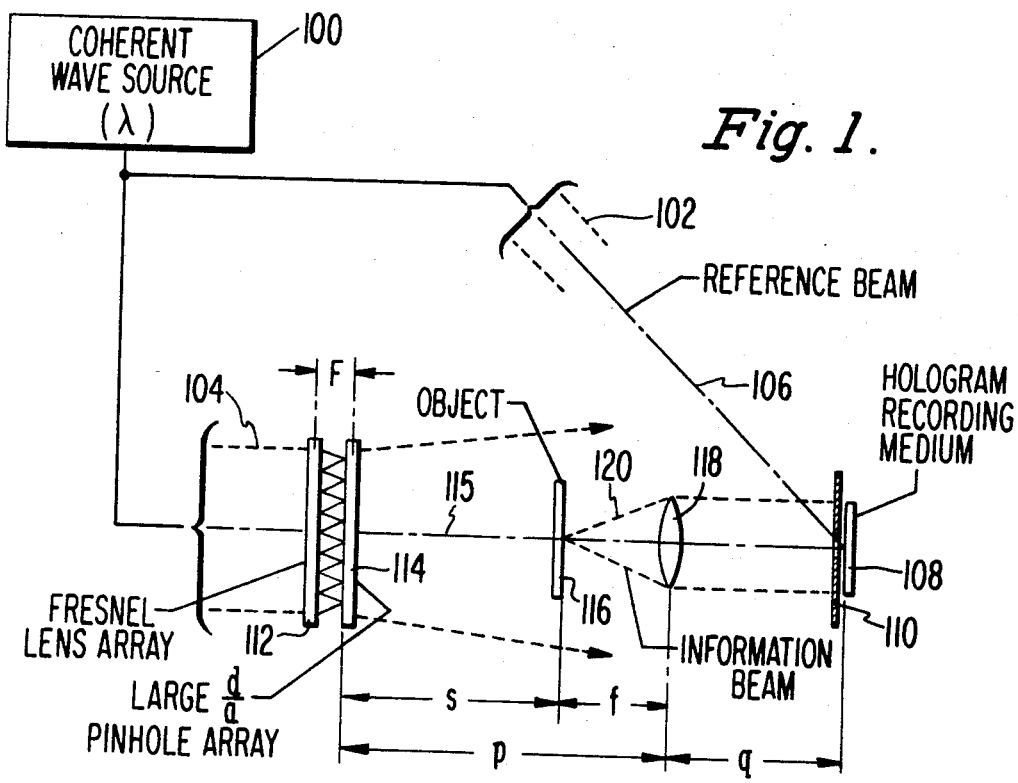
FIG. 1 illustrates in diagrammatic form a preferred embodiment of the improved redundant hologram recording system of the present invention.

In the preferred embodiment of the invention shown in FIG. 1, a Fraunhofer redundant hologram is recorded. However, the invention is not limited to the recording of a Fraunhofer hologram, and may be employed to record any type of redundant hologram.

Coherent wave source 100, which may include a He-Cd laser by way of example, generates coherent wave energy at a given wavelength $\lambda$, which may be 441.6 nanometers, by way of example. As indicated in FIG. 1, this coherent wave energy is divided into mutually coherent reference beam 102 and object beam 104 by suitable optics (not shown) which may include a beam splitter, mirrors, beam enlargers, etc., as is known in the holography art.

Reference beam 102, as indicated by its center line 106, is incident on a small given area of hologram recording medium 108 which is determined by the opening in mask 110.

Object beam 104, after passing through a redundancy means composed of Fresnel lens array 112 and pinhole array 114, illuminates object 116, which may be a transparency having a scene depicted thereon. Object 116, which is located in the focal plane of Fraunhofer lens 118, spatially modulates the wave energy incident thereon to form information beam 120. Fraunhofer lens 118 transforms the spherical wavefront of information beam 120 incident thereon into a plane wavefront which is, in turn, incident on the given area of hologram recording medium 108 through the opening in mask 110. The simultaneous exposure of this given area of hologram recording medium 108 to reference beam 106 and to the plane wavefront of information beam 120 results in the recording of the interference pattern formed thereby as a hologram.

Except for the redundancy means including lens array 112 and pinhole array 114, situated as shown in FIG. 1 at a distance S from object 116, the redundant hologram recording system of FIG. 1, described above, is conventional.

Considering the redundancy means of FIG. 1 in detail, array 114 has substantially identical pinholes arranged in a predetermined periodic pattern having a minimum spacing $d$ between any pair of adjacent pinholes, each of the pinholes having a maximum linear dimension $a$. The shape of the individual pinholes may be circular, eliptical, rectangular, etc; the maximum linear dimension $a$ being the diameter of the circle, the length of the major axis or longest chord of the ellipse, the length of the diagonal of the rectangle, etc., respectively. Furthermore, the predetermined periodic pattern may be a regular polygon pattern, such as a square or regular hexagon, or it may have unequal dimensions in different directions, such as a rectangle or non-regular hexagon. However, as indicated in FIG. 1, the ratio $d/a$ of pinhole array 114 is "large." By "large" is meant a ratio of at least 30. In fact, the ratio $d/a$ is normally between 50 and 1,000, for reasons which will be discussed in detail later on.

Although array 114 may physically be formed of a metal foil or thin plate with holes therethrough, it is preferably made up of a transparent glass plate having an opaque metal film deposited thereon, with the pinhole pattern etched through the opaque metal film. The value of $a$ normally employed is in the range of about 3 – 10 micrometers and the value of $d$ normally employed is in the range of about 300 – 3,000 micrometers. Due to the large $d/a$ ratio of pinhole array 114, the portion of the area of array 114 occupied by all the pinholes thereon themselves is only a tiny fraction of the area occupied by the opaque portion of array 114 between adjacent pinholes. Therefore, in order to achieve reasonable optical efficiency, the redundancy means should preferably include a lens array, such as Fresnel lens array 112, in cooperative relationship with pinhole array 114.

In particular, as shown in FIG. 1, lens array 112 is composed of individual lenses, each having an imaging distance F, corresponding to each respective pinhole of pinhole array 114. Pinhole array 114 is situated in an image plane of array 112. Although in practice the lens array employed could be either a lenticular lens array of fly's eye lenses or a Fresnel lens array of zone plate lenses, a Fresnel lens array is to be preferred. The reason for this is that an array of refracting fly's eye lenses is subject to spherical abberation and other inherent optical defects which are not present in a diffracting Fresnel lens array. Therefore, due to the presence of Fresnel lens array 112, only the non-imaged portion of the wave energy incident on pinhole array 114 is intercepted and absorbed by the opaque portion of pinhole array 114 and all of the imaged portion of the incident wave energy incident on pinhole array 114 passes through the pinholes thereof and emerges on the right side thereof. Thus, high optical efficiency is achieved. The use of a Fresnel lens array in a redundancy means is broadly not part of the present invention.

Further, each respective pinhole of the array can be considered to be the source of a separate spherical wavefront of wave energy which is coherent with the spherical wavefront of the wave energy emerging from each other pinhole of the array. As these spherical wavefronts travel to the right, various ones of these spherical wavefronts of wave energy will overlap and interfere with each other to provide coherent beam of wave energy 115 with a complex spatial distribution of intensity resulting from constructive and destructive interference among the overlapping spherical wavefronts.

Further, as indicated in FIG. 1, coherent beam of wave energy 115, which illuminates object 116, diverges as it travels to the right. The relative size and position of object 116 with respect to beam 115 is such that only the more central portion of beam 115 is incident on object 116. This ensures that the wave energy reaching any point of object 116 originates from a substantial number of different pinholes of pinhole array 114.

As discussed above, pinhole array 114 has substantially identical pinholes arranged in a predetermined periodic pattern with a minimum spacing $d$ between any pair of adjacent pinholes, each of the pinholes having a maximum linear dimension $a$. As is known in physical optics, such an array illuminated with coherent wave energy of wavelength $\lambda$ will self-image an array of effective wave energy sources arranged in the same predetermined periodic pattern with substantially the same minimum spacing $d$ at distances equal to $n\,d^2/\lambda$, where $n$ is an integer. In accordance with one feature of the present invention, the ratio $d^2/\lambda$ should be at least 25 centimeters and, preferably, should be in the order of 1 meter or more. This is consistent with a value of $d$ of at least 300 micrometers and, preferably in the range of 500 – 3,000 micrometers. It is also consistent with a value for the wavelength $\lambda$ in the visible light range and, preferably, of no more than 500 nanometers. Coherent wave energy from a He-Cd laser at a wavelength of 441.6 nanometers is quite suitable. Since a distance of at least 25 centimeters is quite long, the value of the integer $n$ employed in the present invention is preferably unity, and will be assumed to have this value in the following discussion.

As discussed above, each pinhole of pinhole array 114 may be considered as a separate source of coherent wave energy having spherical wavefront. As it is also known in physical optics, pinhole array 114 will form an image in every image plane located at a distance equal to $(1 \pm (1/m))\,d^2/\lambda$ from the plane of pinhole array 114, where $m$ is a plural integer. The image in each image plane also consists of an array of effective wave energy source arranged in the same predetermined periodic pattern as that of pinhole array 114 itself, but the spacing between any pair of adjacent sources of the image is reduced by a factor $1/m$ so as to have a minimum spacing $d/m$ (rather than the minimum spacing $d$ of pinhole array 114 itself).

Referring back to FIG. 1, the distance S between pinhole array 114 and object 116 is such that object 116 is located in an image plane of pinhole array 114 in which the minimum spacing between the effective wave energy sources is $d/m$. The effective redundancy and resolution of the recorded hologram increases as the effective respective values of $d$ and $m$ increase, i.e., these should be relatively large and the ratio of $d/m$ should be relatively small. In accordance with one feature of the present invention, the value of $m$ is at least 10 when $d^2/\lambda$ is at least 25 centimeters and is at least 30 when $d^2/\lambda$ is in the order of 1 meter or more. In the first case, the separation between the adjacent image planes in which $m$ is equal to 10 and in which $m$ is equal to 11 is less than 2.3 millimeters, the separation between adjacent image planes as the value of $m$ increases becomes much smaller very quickly. In the second case, the separation between adjacent image planes when $m$ is 30 and when $m$ is 31 is less than 1.1 millimeters. Again, as the value of $m$ increases, the separation distance becomes smaller very quickly. Therefore, if high values of $m$ are to be employed, in order to achieve high effective redundancy and resolution, the value of $d^2/\lambda$ must also be increased in order to provide a sufficient separation between adjacent image planes in a practical system so that object 116 may be accurately positioned in a particular preselected image plane of pinhole array 114. For instance, in a practical system with a value of $m$ approaching 50 and the value of $d^2/\lambda$ of around 1 meter, the separation between adjacent image planes is less than one-quarter millimeter. Thus, it is practically impossible to achieve relatively large values of $m$, required to provide high effective redundancy and resolution, without employing a pinhole array having relatively large values of $d$, even when the wavelength of the coherent light being employed is relatively short.

Up to now, the redundant hologram recording system shown in FIG. 1 has been discussed as though the recording optical elements were all ideal. This, of course, is not the case in practice. For instance, it has been assumed that all the very tiny individual pinholes of the array are all perfect. However, from a probability point of view, the chance that at least one of a very large number of tiny pinholes in the array is defective becomes appreciable. In fact, the chance of a perfect array decreases with the number of pinholes in the array. Since the total number of pinholes in a pinhole array of a given area decreases as the ratio $d/a$ increases, both the likelihood and the extent of defects in the large $d/a$ pinhole array employed in the redundancy means of the present invention are many times smaller than is the case in the relatively small $d/a$ pinhole arrays employed in the redundancy means of the prior art.

A hologram recording system employing, as it does, coherent wave energy, is much more sensitive to slight defects in the various optical elements thereof. These optical elements include lens array 112, pinhole array 114, object 116, lens 120 and recording medium 108. The optical defects referred to include lack of perfection in the actual lens array 112 or pinhole array 114, which disturb the required periodocity of the predetermined periodic pattern of effective sources of wave energy; any scattering by dust or otherwise of wave energy incident on object 116, lens 118, mask 110 or hologram recording medium 108; the relatively small aperture of an actual hologram recording system; the limited dynamic range of recording medium 108 in practice which results in the saturation of those points thereof which are intensely exposed, and other similar defects which disturb in practice the normally assumed ideal hologram recording conditions.

In particular, in a recording system employing incoherent wave energy, rather than in coherent wave energy, the addition of a small unwanted noise signal having, by way of example, an amplitude of 1 percent of the signal amplitude at any given spatial point in the recording results in an increase of only one part in 10,000 in the desired mean power level at that point, i.e., the noise is 80 db below the signal. Under these conditions, the noise is too small to be noticeable. On the other hand, in a recording system employing coherent wave energy, which is the case in a hologram recording system, the actual field strength (not just the mean power level) at each point of the recording area must be considered. For instance, if two points one spatial wavelength apart both have the same nominal signal level, due to the presence of a spurious noise signal having an amplitude of only 1 percent of the signal, a combined signal at one of these points will have a resultant amplitude of 99 percent of its nominal value and a combined signal at the other of these points will have a resultant amplitude of 101 percent of its nominal value. The relative difference in the mean power level between these two points is therefore 400 parts in 10,000, while in the case of incoherent wave energy the mean power level at both points would be the same at a value of only about one part in 10,000 above the desired nominal power level at these points. A power difference of 400 parts in 10,000 is clearly noticeable in the reconstructed image of the hologram and appears as a spurious fringe pattern which degrades the quality of the reconstructed image.

In accordance with a feature of the present invention, it has been found that coherent noise produced by defects in the optical elements of the hologram recording system can be minimized by appropriately selecting the image plane of pinhole array 114 in which object 116 is located when pinhole array 114 has an appropriate predetermined periodic pattern. In particular, a separate portion of the object is sampled by each effective source of wave energy in the image plane in which object 116 is located. When the relative phase of the wave energy of each one of these sources is such that the vector sum of the wave energy from all other sources adjacent that one source has a phase which is substantially in quadrature with that of said one source and/or has a minimum amplitude, preferably zero, noticeable coherent noise, such as spurious interference fringes, in the reconstructed image of a recorded hologram is eliminated or at least reduced.

Figure 2:
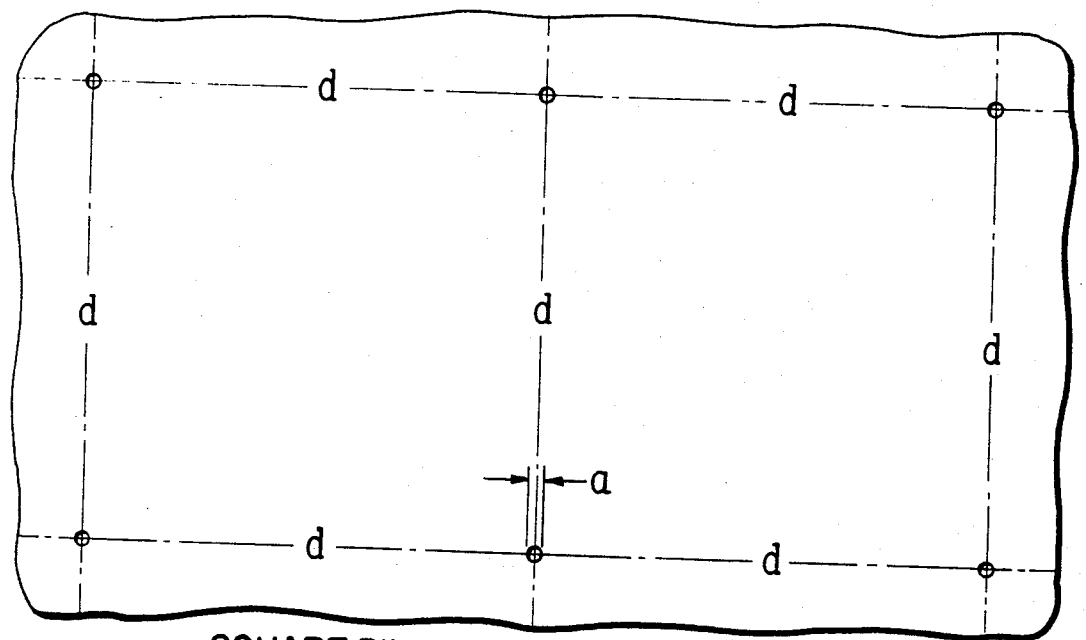
FIG. 2 illustrates a first particularly suitable pattern for the pinhole array of FIG. 1.

It has been demonstrated that when pinhole array 114 has a square pattern of pinholes, arranged with respect to each other, as shown in FIG. 2, and at the same time the distance S in FIG. 1 is selected so that object 116 lies in an image plane in which the integer $m$ is even, the phase of the wave energy of any one source sampling a portion of object 116 will be substantially in quadrature with the vector sum of the wave energy from all other sources adjacent that one source.

Figure 3:
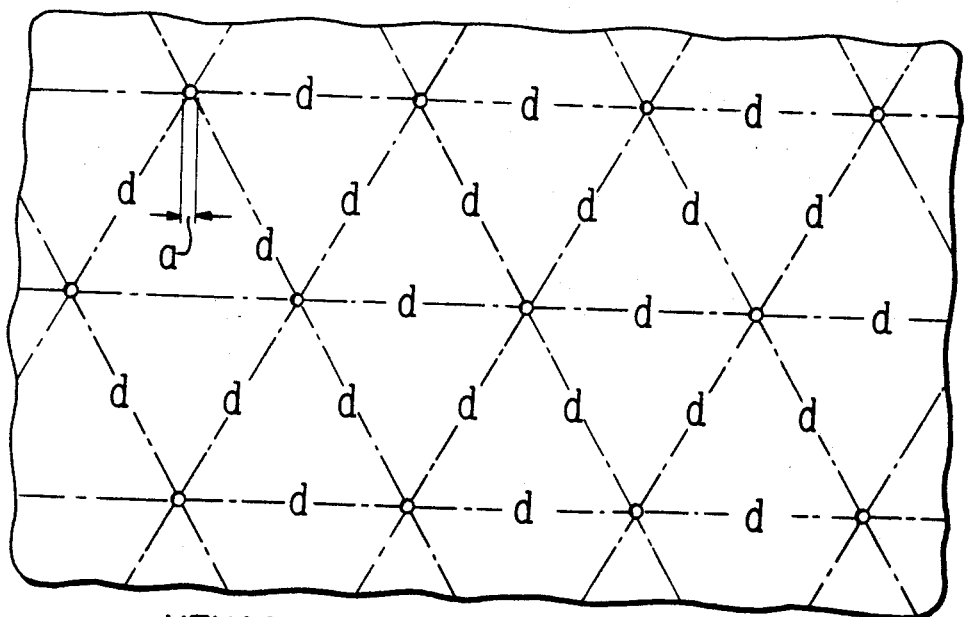
FIG. 3 illustrates a second particularly suitable pattern for the pinhole array of FIG. 1.

It has also been demonstrated that when pinhole array 114 has a regular hexagonal pattern, as shown in FIG. 3, certain image planes thereof in array of effective wave energy sources will be derived in which the angular orientation of the source array is substantially identical to that of the pinhole array itself. Thus, in this case, if the hexagonal pattern of the pinhole array itself is such that a pair of opposite sides thereof are horizontal, the effective wave energy sources in certain image planes will also form an array of hexagons each having a pair of horizontal sides. However, in other image planes than said certain ones of a hexagonal pinhole array, the orientation of the effective wave energy sources in the image plane will be rotated 60° with respect to the pinhole array itself, so that each of the hexagons in the image plane will have a pair of vertical sides when each of the hexagons of the hexagonal pinhole array itself has a pair of horizontal sides. When object 116 is located in one of the certain image planes of a hexagonal pinhole array in which the angular orientation of the hexagon of the source array is substantially the same as that of the hexagon of the pinhole array, rather than being rotated with respect thereto, the vector sum of the wave energy from all sources adjacent in one source has a minimum amplitude which approaches zero.

Referring back to FIG. 1, pinhole array 114 is shown at a distance p from the principal plane of Fraunhofer lens 118, while hologram recording medium 108 is located at a distance q from the principal plane of Fraunhofer lens 120. If the recorded hologram is to be in motion during playback, which is often the case in the playback of Fraunhofer holograms, it is desirable, although not essential, that the distance q be made such that Fraunhofer lens 118 images pinhole array 114 in an image plane which either coincides with or is in the immediate vicinity of hologram recording medium 108. This reduces the noticeable effect of moving noise, due to the presence of pinhole array 114, in the reconstructed image when the Fraunhofer hologram is moved during playback. This latter feature is broadly not part of the present invention.

What is claimed is:

1. In a system for recording a redundant hologram of an object on a given area of a recording medium with mutually coherent reference and information beams of wave energy of a given wavelength $\lambda$, said system comprising illuminating means including a pinhole array in spaced relation with said object for illuminating said object through said pinhole array with coherent wave energy of said given wavelength $\lambda$ to provide said information beam;

the improvement therein wherein said array has substantially identical pinholes arranged in a predetermined periodic pattern with minimum spacing $d$ between any pair of adjacent pinholes, each of said pinholes having a maximum linear dimension $a$, the ratio of $d/a$ being in the range of 50 to 1,000.

2. The system defined in claim 1, wherein said illuminating means further comprises a lens array corresponding to said pinhole array with said pinhole array being situated for the focal plane of said lens array with the focal point of each respective lens thereof being positioned substantially in th center of the pinhole corresponding thereto.

3. The system defined in claim 2, wherein said lens array is a Fresnel lens array.

4. The system defined in claim 1, wherein the ratio $d^2/\lambda$ is at least 25 centimeters.

5. The system defined in claim 1, wherein the ratio $d^2/\lambda$ is in the order of 1 meter or more.

6. The system defined in claim 1, wherein said object is located in a given image plane of said pinhole array characterized in that said image consists of an array of effective wave energy sources arranged in said predetermined periodic pattern with substantially the same given spacing $d/m$, where $m$ is a plural integer, between any pair of adjacent sources.

7. The system defined in claim 6, wherein said periodic pattern is a square and $m$ is an even integer.

8. The system defined in claim 7, wherein $d^2/\lambda$ is at least 25 centimeters and $m$ is at least 10.

9. The system defined in claim 7, wherein $d^2/\lambda$ is in the order of 1 meter or more and $m$ is at least 30.

10. The system defined in claim 6, wherein said polygon is a regular hexagon, and wherein said given image plane is such that the angular orientation of the hexagon of said source array is substantialy the same as that of said hexagon of said pinhole array.

11. The system defined in claim 10, wherein $d^2/\lambda$ is at least 25 centimeters and $m$ is at least 10.

12. The system defined in claim 10, wherein $d^2/\lambda$ is in the order of 1 meter or more and $m$ is at least 30.

13. The system defined in claim 6, wherein each source of a certain set of said array of sources samples a separate portion of said object, and wherein the relative phase of the wave energy of each source of said array is such that the vector sum of the wave energy from all sources adjacent any one source has a minimum amplitude.

14. The system defined in claim 13, wherein said minimum amplitude is substantially zero.

15. The system defined in claim 6, wherein each source of a certain set of said array of sources sample a separate portion of said object, and wherein the relative phase of the wave energy of each source of said array is such that the vector sum of the wave energy from all sources adjacent any one source of said set has a phase which is substantially in quadrature with that of said one source.

16. The system defined in claim 1, wherein said wave energy is light.

17. The system defined in claim 16, wherein $\lambda$ is less than 500 nanometers and $d$ is at least 500 micrometers.

* * * * *